Patented July 14, 1942

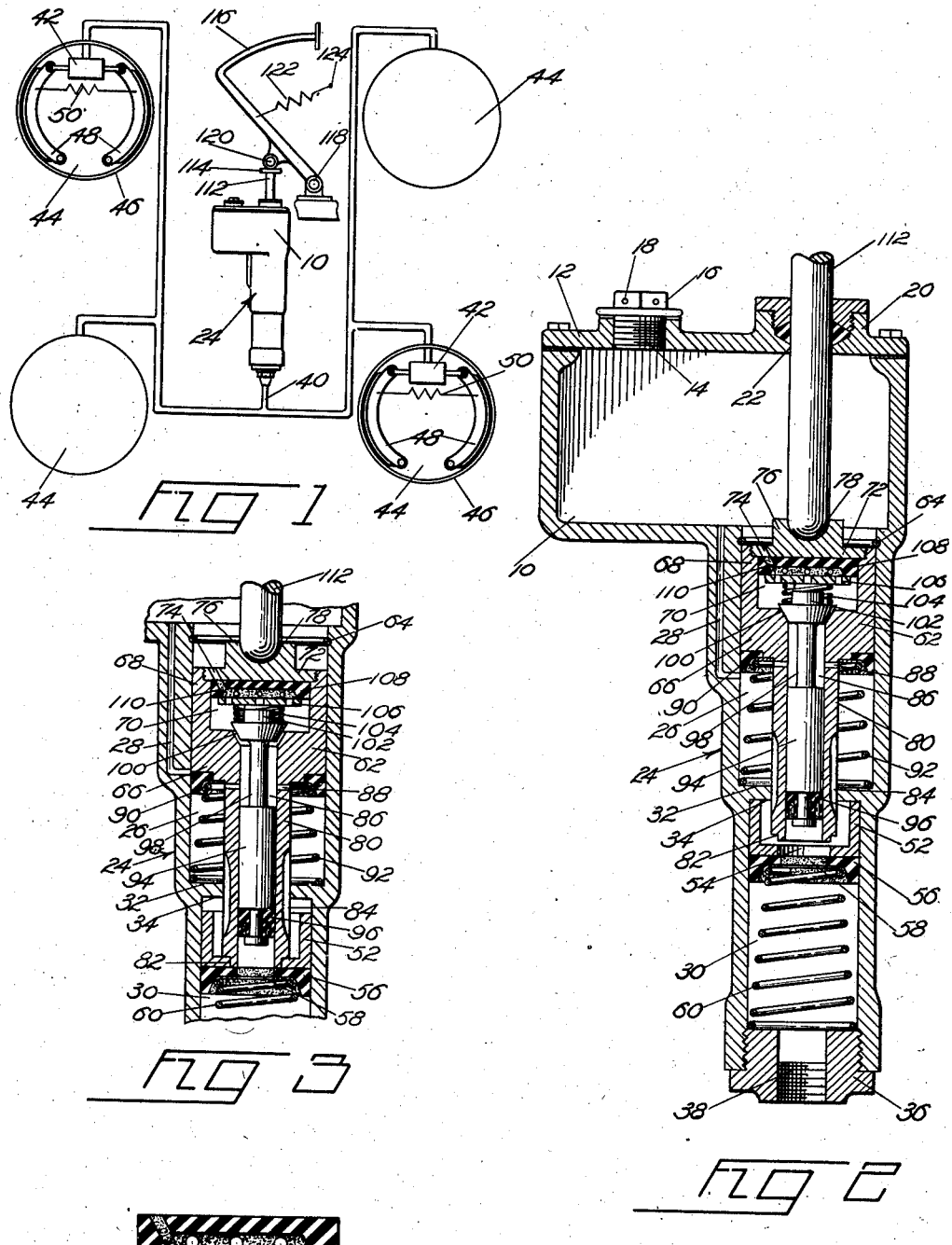
July 14, 1942. H. C. SWIFT 2,289,525
FLUID PRESSURE PRODUCING DEVICE
Filed Nov. 24, 1939
INVENTOR.
HARVEY C. SWIFT
BY O. H. Fowler
ATTORNEY.

2,289,525

UNITED STATES PATENT OFFICE 2,289,525

FLUID PRESSURE PRODUCING DEVICE

Harvey C. Swift, Detroit, Mich., assignor to Hydraulic Brake Company, Detroit, Mich., a corporation of California Application November 24, 1939, Serial No. 306,012

9 Claims. (Cl. 60—54.6)

This invention relates to fluid pressure braking systems, and more particularly to fluid pressure producing devices for such systems.

Broadly the invention comprehends a fluid pressure producing device having two phases, one for producing low pressure and another for producing a relatively high pressure without perceptible increase in the activative force.

An object of the invention is to provide a two-phase fluid pressure producing device including means for distributing the transition from low to a relatively high pressure over a prolonged period so as to smooth out the operation of the system.

Another object of the invention is to provide a two-phase fluid pressure producing device including a low pressure producing means, a high pressure producing means, means for transferring pressure from one to the other, and means for inhibiting actuation of the high pressure producing means in advance of the low pressure producing means.

Other objects and advantages of the invention will appear from the following description taken in connection with the drawing forming a part of this specification, and in which—

Fig. 1 is a schematic view of a fluid pressure braking system embodying the invention;

Fig. 2 is a vertical sectional view of the fluid pressure producing device;

Fig. 3 is a fragmentary view in section, illustrating the piston on the compression stroke; and Fig. 4 is an enlarged sectional view of the compressible sealing cup.

Referring to the drawing for more specific details of the invention, 10 represents a fluid reservoir closed at its top as by a removable cover plate 12, having a filling opening 14, normally closed by a plug 16 having openings 18 therethrough for venting the reservoir to the atmosphere. The cover plate also has thereon a packing box 20 and an opening 22 therethrough concentrically disposed with relation to the packing box.

A cylinder 24 depending from the bottom of the reservoir and opening into the reservoir in concentric relation to the opening 22 in the cover plate includes a large chamber 26 opening directly into the reservoir and communicating with the reservoir as by a passage 28, and a relatively small chamber 30 arranged in concentric relation to and forward of the large chamber and separated therefrom as by a diaphragm 32 having a concentric opening 34 providing a communication between the large and small chamber, and the small chamber is closed as by a head 36 provided with a discharge port 38.

A fluid pressure delivery pipe or conduit 40 connected to the discharge port 38 has branches connected respectively to fluid pressure actuated motors 42, preferably arranged in pairs, one pair for actuating brakes associated with the front wheels of a vehicle, and another pair for actuating brakes associated with the rear wheels of the vehicle.

The brakes may be of conventional type each including a fixed support or backing plate 44 adapted to be secured to an axle or to an axle housing, a rotatable drum 46 associated with the backing plate and adapted to be secured to a wheel, a pair of corresponding interchangeable friction elements or shoes 48 mounted on the backing plate for cooperation with the drum, a retractile spring 50 connecting the shoes, and a motor corresponding to the motors 42 mounted on the backing plate between the shoes and operative to actuate the shoes into engagement with the drum against the resistance of the retractile spring 50.

A hollow piston 52 reciprocable in the small chamber 30 has a concentric opening or port 54 in its head, and seated on the head of the piston is a sealing cup 56 having a concentric opening 58. The perimeter of the cup defining the opening 58 overhangs the perimeter of the head defining the opening 54, the object of which will hereinafter appear. A spring 60 interposed between the cup 56 and the head 36 of the small chamber serves to retain the sealing cup 56 against displacement and also to return the piston 52 to its retracted position wherein the piston seats on the diaphragm 32.

A piston 62 reciprocable in the large chamber 26 is held against displacement as by a retaining ring 64 seated in a groove in the wall of the large chamber adjacent that end of the chamber opening into the reservoir. The piston 62 includes a head 66 and a hollow body portion 68 providing a chamber 70 closed as by a head 72 having a plurality of equally spaced ports 74 and a concentric boss 76 provided with a socket 78, the purpose of which will hereinafter appear.

The head 66 has a concentric extension 80 projected through the opening 34 in the diaphragm 32 between the chambers 26 and 30. The extension 80 has a reduced end portion 82 adapted to enter the opening 54 in the head of the hollow piston 52 and abut the overhanging perimeter of the sealing cup 56 so as to seal the piston 52, and the extension also has a plurality of spaced longitudinally extended circumferential grooves or channels 84 normally providing communications between the chamber 26 and the hollow piston 52.

The head 66 of the piston 62 and the extension 80 thereon are axially bored to provide a chamber 86 communicating directly with the hollow piston 52 and the chamber 70, also with the chamber 26 by way of spaced ports 88. The head 66 has thereon a sealing cup 90, and a spring 92 sleeved on the extension 80 between this cup and the diaphragm 32 serves to retain the cup against displacement and also to return the piston to its retracted position.

A piston 94 reciprocable in the chamber 86 has on its head a sealing cup 96 for inhibiting seepage of fluid past the piston, and on the back of this piston is a rod 98 supporting a valve 100 suitable for cooperation with a valve seat on the back of the head 66 of the piston 62 for control of the communication between the chambers 70 and 86. The valve 100 has a concentric double-diametral extension 102, and sleeved on this extension is a spring 104 supporting a perforated disc 106, also sleeved on the extension, and the disc is supported on a compressible sealing cup 108 having spaced openings 110 therethrough registering with the openings 74 of the closure plate or head 72.

A thrust rod 112 extending through the stuffing box 20 and opening 22 in the cover of the reservoir has one of its ends seated in the socket 78 on the back of piston 62, and the other end of this rod has an enlarged head 114. A foot pedal lever 116 rockable on a stub shaft 118 carries a roller 120 for cooperation with the head 114, and a retractile spring 122 connects the lever to a fixed support 124.

In a normal operation, upon depressing the foot pedal lever 116, force is transmitted from the lever through the rod 112 to the piston 62, resulting in advancing the piston on its compression stroke. During the initial movement of the piston 62 on its compression stroke, the sealing cup 90 on the head of the piston closes the communication 28 between the reservoir 10 and the chamber 26, and, thereafter, as the piston 62 advances on its compression stroke, fluid in the chamber 26 forward of the piston 62 is displaced from the cylinder through the channels 84 into the hollow piston 52, thence through the port 54 in the head of the piston 52 and the opening 58 in the sealing cup 56 into the small chamber 30, thence through the discharge port 38 and fluid pressure delivery pipe or conduit 40 and its respective branches into the fluid pressure actuated motors 42, resulting in energization of the motors and the consequent actuation of the friction elements or shoes 48 into engagement with the drum 46 against the resistance of the retractile springs 50 to effectively retard rotation of the drums.

Upon advance of the piston 62 for a predetermined portion of its compression stroke, no movement is transmitted to piston 52. As the reduced end 82 on the extension 80 of the piston 62 approaches the port 54 in the piston 52, the surge of fluid under pressure from chamber 26 is sufficient to force the piston 52 forward, spaced apart from the extension 80, until a predetermined pressure is attained on the fluid in the system to thereby transfer the pressure to the piston 52 from the piston 62. With the transfer of pressure to the piston 52, pistons 52 and 62 move as a unit, and the fluid in the chamber 30 forward of the piston 52 is displaced therefrom through the discharge port 38 and fluid pressure delivery pipe 40 and its branches into the motors 42 to further actuate the motors so as to increase the braking force.

During this operation, the fluid in the chamber 26 forward of the piston 62 is displaced therefrom through the ports 88 into the chamber 86, past the valve 100, into the chamber 70, thence through the perforated disc 106, the restricted ports 110 in the sealing cup 108, and the ports 74 in the head 62 of the chamber 70, into the reservoir.

The valve 100 opens to relieve the pressure on the fluid in the chamber 26 as the result of the predetermined pressure on the fluid in the chamber 30 acting on the head of the piston 94. It is essential for a smooth operation that the relief of pressure on the fluid in the large chamber 26 should not take place rapidly, because under such a condition the first phase of the operation would be completely lost and pressure on the fluid would be created only in the small chamber 30.

To avoid such a contingency, during a normal operation, after the attainment of the predetermined pressure on the fluid in the chambers 26 and 30 pressure acting on the plunger 94 and the valve 100 is sufficient only to open the valve 100 slowly so that the transition from low pressure to high pressure may be effected smoothly, and the fluid in the chamber 26 metered therefrom gradually so as to impose a constantly increasing drag on the piston 52. This is accomplished in view of the increased pressure developed in chamber 30 and the consequent further movement of piston 94 and valve 100 against the resistance of the compressible sealing cup 108 to thereby strangulate the openings 110 to effect a controlled metering of the fluid from chamber 26.

In instances where the piston 62 is moved rapidly on its compression stroke, occurring upon an impetuous operation of the brakes, the pressure on the fluid in the chambers 26 and 30, acting on the piston 94 and the valve 100, opens the valve against the resistance of the spring 104 seated on the perforated disc 106 supported on the flexible cup 108 having openings 110 therethrough registering with the ports 74 in the chamber 70 communicating with the reservoir.

In this operation, during the initial movement of the piston 62, opening of the valve is accomplished quite rapidly, and this results in compressing the flexible cup 108 to such an extent that the openings 110 are closed so that the pressure on the fluid in the cylinder 26 is not relieved until a balance of pressure is attained in the chambers 26 and 30 equivalent to or slightly greater than the predetermined pressure, thereby acting on the piston 94 and the valve 100 as to retain the valve open but not to such an extent as to impose sufficient pressure on the flexible cup to close the openings 110, yet adequate to so distort the cup as to restrict the openings 110, to the end that the fluid in the chamber 26 may be metered gradually therefrom as the pistons are further advanced.

Upon conclusion of a braking operation, the foot pedal lever 116 is released, and is returned to its normal retracted position under the influence of the retractile spring 122. This results in release of the piston 62 and return of this piston to its retracted position under the influence of the retractile spring 92, and return of the piston 62 results in release of the piston 52 and return of this piston to its retracted position under the influence of the retractile spring 60.

As the piston 62 returns to its retracted position, the valve 100 closes under the influence of the spring 104, and the cup 90 on the head of the piston uncovers the passage 28 providing a communication between the reservoir and the chamber 26. Also, the extension 80 on the piston 62 is withdrawn from the port 54 in the head of the piston 52 so as to establish communication between the chambers 26 and 30, and during this operation fluid is returning to the chamber 30 from the fluid pressure actuated motors 42 and the fluid pressure delivery pipe 40 and branches thereof connecting the motors to the cylinder, under the influence of the retractile springs of the brake structures. The fluid received in the chamber 30 is displaced therefrom, through the port 54, into the hollow piston 52, thence through the passages 84 in the circumference of the extension 80, into the chamber 26, thence through the passage 28 into the reservoir.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A fluid pressure producing device comprising a cylinder, a piston movable therein for creating pressure having a passage therethrough, and means for control of the passage including a compressible member having a variable orifice therethrough operative to throttle the fluid flow through the passage upon the initial movement of the piston.

2. A fluid pressure producing device comprising a cylinder, a piston movable therein for creating pressure having a passage therethrough, means for control of the passage including a valve, and a flexible cup having a variable orifice therethrough for cooperation with the valve operative upon the creation of pressure to throttle the fluid flow through the passage.

3. A fluid pressure producing device comprising a cylinder, a piston movable therein for creating pressure having a passage therethrough, and means for control of the passage including a valve and a compressible member having a distortable orifice therethrough operative upon the advance of the piston to incremently meter the flow of fluid through the passage.

4. A fluid pressure producing device comprising a cylinder depending from a reservoir, a piston movable therein for creating pressure having a passage therethrough communicating with the reservoir, a valve responsive to pressure on the fluid in the cylinder normally closing the passage, and compressible means having variable orifices therethrough for throttling the passage controlled by the valve upon the forward movement of the piston.

5. A fluid pressure producing device comprising a cylinder depending from a reservoir, a piston movable therein for creating pressure having an opening therethrough communicating with the reservoir, means for control of the passage including a valve responsive to pressure on the fluid in the cylinder, and a compressible member cooperating with the valve having a distortable orifice therethrough for throttling the passage upon forward movement of the piston.

6. A fluid pressure producing device comprising a reservoir, a cylinder depending therefrom and opening into the reservoir, a piston reciprocable in the cylinder having a hollow body providing a chamber having a port opening through the head of the piston and an opening providing a communication between the chamber and the reservoir, a valve for control of the port, and a compressible member having a distortable orifice for control of the opening between the chamber and the reservoir.

7. A fluid pressure producing device comprising a reservoir, a cylinder depending from and opening into the reservoir, a piston reciprocable in the cylinder including spaced heads each having an opening therethrough, a forwardly extended projection on one of the pistons adapted to enter and close the opening in the other head, said extension having a passage therethrough registering with the openings in the heads of the piston and ports communicating with the cylinder between the heads, and means for control of the passage including a valve and a compressible member having a distortable orifice for throttling the passage.

8. A fluid pressure producing device comprising a reservoir, a cylinder depending from and communicating therewith having a large chamber and a small chamber, a piston reciprocable in each of the chambers having openings through the heads thereof, an extension on the piston in the large chamber adapted to enter and close the opening in the head of the other piston, said extension having a passage therethrough registering with the openings in the heads of the pistons and ports communicating with the large chamber, a piston movable in the passage responsive to pressure on the fluid in the small chamber, a valve carried by the last-mentioned piston for control of the passage, and a compressible member cooperating with the valve having a distortable orifice for throttling the passage.

9. A fluid pressure producing device comprising a reservoir, a cylinder depending from and communicating with the reservoir having a large cylinder provided with a port communicating with the reservoir and a small chamber having a discharge port, a piston reciprocable in the large chamber having a chamber therein provided with a port opening through the head of the piston and an opening communicating with the reservoir, a piston reciprocable in the small chamber having a port in its head, an extension on the piston in the large chamber adapted to enter and close the port in the head of the piston in the small chamber, said extension having a passage therethrough communicating with the ports in the heads of the pistons, and a plurality of spaced ports communicating with the large chamber, a piston movable in the passage responsive to pressure on the fluid in the small chamber, a valve carried by the last-mentioned piston for control of the passage, and a compressible member having a distortable orifice for control of the communication between the reservoir and the chamber in the piston.

HARVEY C. SWIFT.